(12) United States Patent
Roberfroid et al.

(10) Patent No.: US 8,701,297 B2
(45) Date of Patent: Apr. 22, 2014

(54) METHOD OF DETERMINING HEADING BY TURNING AN INERTIAL DEVICE

(75) Inventors: David Roberfroid, Paris (FR);
Jean-Baptiste Eudier, Paris (FR);
Alexandre Gori, Paris (FR)

(73) Assignee: Sagem Defense Securite, Paris (FR)

( * ) Notice: Subject to any disclaimer, the term of this patent is extended or adjusted under 35 U.S.C. 154(b) by 151 days.

(21) Appl. No.: 13/510,224

(22) PCT Filed: Dec. 6, 2010

(86) PCT No.: PCT/EP2010/007388
§ 371 (c)(1),
(2), (4) Date: May 16, 2012

(87) PCT Pub. No.: WO2011/069627
PCT Pub. Date: Jun. 16, 2011

(65) Prior Publication Data
US 2012/0222319 A1    Sep. 6, 2012

Related U.S. Application Data

(60) Provisional application No. 61/345,368, filed on May 17, 2010.

(30) Foreign Application Priority Data

Dec. 7, 2009    (FR) ...................................... 09 05916

(51) Int. Cl.
*G01C 19/56*    (2012.01)
*G01C 21/16*    (2006.01)

(52) U.S. Cl.
CPC .............. *G01C 19/56* (2013.01); *G01C 21/16* (2013.01)
USPC .................................... 33/355 R; 33/366.11

(58) Field of Classification Search
CPC ......... G01C 19/56; G01C 21/16; G01C 17/00
USPC .................................... 33/355 R, 356, 366.11
See application file for complete search history.

(56) References Cited

U.S. PATENT DOCUMENTS 6,032,531 A * 3/2000 Roszhart .................... 73/504.04
6,138,511 A * 10/2000 Stewart .......................... 73/510

(Continued)

FOREIGN PATENT DOCUMENTS

EP    1 722 193 A2    11/2006
FR    2 920 224 A1    2/2009

*Primary Examiner* — G. Bradley Bennett
(74) *Attorney, Agent, or Firm* — Muncy, Geissler, Olds & Lowe, P.C.

(57) ABSTRACT

A method of determining a heading by means of an inertial device (1) comprising at least one vibratory angle sensor (3) having a resonator associated with detector means and means for setting the resonator into vibration connected to a control unit to have a first mode of operation in which the vibration is left free to move in an angular frame of reference of the resonator, and a second mode of operation in which the vibration is maintained at a predetermined angle in the frame of reference of the resonator, and the method comprising the steps of: controlling the sensor in the second mode of operation to maintain the vibration on a predetermined electric angle corresponding to a least-error value of the sensor; and controlling the sensor in the first mode of operation to take a heading measurement, and controlling the sensor in the second mode of operation once the measurement has been taken and until the next measurement in order to maintain the vibration on the predetermined electric angle.

6 Claims, 1 Drawing Sheet

(56) References Cited

U.S. PATENT DOCUMENTS

| | | | |
|---|---|---|---|
| 7,513,140 B2* | 4/2009 | Kato | 73/1.37 |
| 2009/0205422 A1* | 8/2009 | Caron et al. | 73/504.12 |
| 2012/0203456 A1* | 8/2012 | Lignon | 701/511 |
| 2012/0222320 A1* | 9/2012 | Roberfroid et al. | 33/324 |
| 2013/0269433 A1* | 10/2013 | Jeanroy | 73/504.12 |
| 2013/0298670 A1* | 11/2013 | Tsugai et al. | 73/504.12 |

* cited by examiner

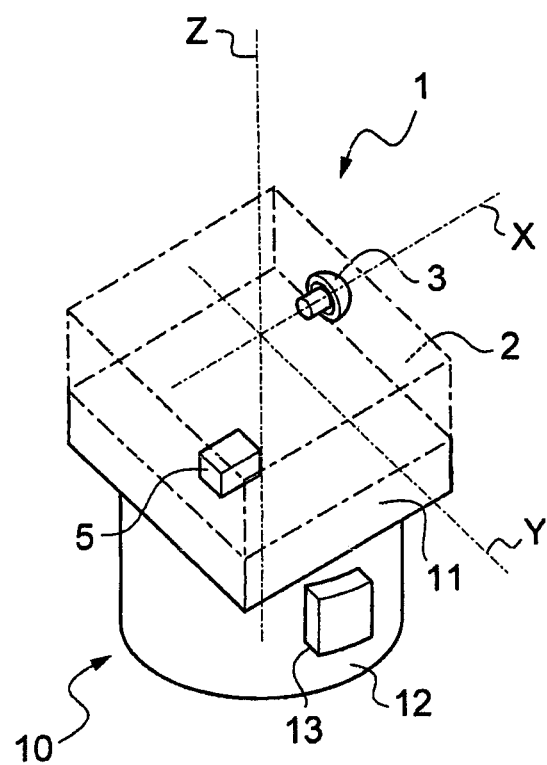

METHOD OF DETERMINING HEADING BY TURNING AN INERTIAL DEVICE

The present invention relates to a method of determining a heading by means of an inertial device suitable for use, for example, as a gyro compass, and for seeking north.

It is known to determine a heading by means of an inertial device in such a manner as to measure and position the movement resulting from rotation of the Earth, i.e. to detect the east/west direction.

Such an inertial device includes a vibratory angle sensor having a resonator associated with detector means and vibration means for setting the resonator into vibration, which means are connected to a control unit. The vibration means make use of a high voltage.

Heading may be determined by controlling the angle sensor in a free gyro mode of operation in which its vibration is left free to move in an angular frame of reference of the resonator. The vibration moves under the effect of the rotation of the Earth and the angular movement of the vibration is detected in order to determine the north direction. This mode of operation is advantageous since it allows measurement over a large range, it presents a scale factor that is stable, and it depends little on the quality of the high voltage. However, in this mode of operation, there are non-linear biases as a result of using analog-to-digital converters that give rise to a lack of continuity in the detected signal. These errors degrade performance, more particularly in the vicinity of 0°, 90°, 180°, 270° because the processing of the measurement relies on the sines and the cosines of these angles.

Heading may also be determined by controlling the angle sensor in a rate gyro mode in which its vibration is maintained at a predetermined angle in the frame of reference of the resonator. The energy needed for maintaining the vibration at said angle in spite of the influence of the rotation of the Earth is detected in order to determine the north direction. This mode of operation is advantageous since it presents bias that is stable for a given electric angle, but in contrast it presents a scale factor that is sensitive to the quality of the high voltage.

An object of the invention is to provide means for further improving performance when detecting heading by means of an inertial device.

To this end, the invention provides a method of determining a heading by means of an inertial device comprising at least one vibratory angle sensor having a resonator associated with detector means and means for setting the resonator into vibration connected to a control unit to have a first mode of operation in which the vibration is left free to move in an angular frame of reference of the resonator, and a second mode of operation in which the vibration is maintained at a predetermined angle in the frame of reference of the resonator, and the method comprising the steps of:

controlling the sensor in the second mode of operation to maintain the vibration on a predetermined electric angle corresponding to a least-error value of the sensor; and controlling the sensor in the first mode of operation to take a heading measurement, and controlling the sensor in the second mode of operation once the measurement has been taken and until the next measurement in order to maintain the vibration on the predetermined electric angle.

Thus, the angle sensor operates as a rate gyro so long as a measurement command is not received by the inertial device, and as a free gyro when a measurement is to be performed. The operation in rate gyro mode serves to maintain the vibration at an angle for which the sensor presents the best performance. During measurement, the sensor is controlled to operate in free gyro mode: since the measured angular speed is small, fifteen degrees per hour, and since the measurement takes place in a short length of time, about two minutes, the vibration remains close to the selected angle. It is thus possible to obtain good measurement accuracy.

Preferably, the detector means are connected to the control unit via at least one analog-to-digital converter, and the least-error value is selected as a function of the dynamic range of the converter.

This constitutes an error that has a major influence on the performance of the sensor.

Advantageously, the method includes a prior calibration step in which a series of measurements are performed for different vibration angles, and the least-error value is selected from the series of measurements.

The calibration step makes it possible to determine the least-error value specific to the sensor in question and to the actual measurement conditions.

Also preferably, the measurement is performed after a stabilization period following the changeover from the second mode of operation to the first mode of operation.

This makes it possible to limit an unwanted influence of the rate gyro mode of operation (inertia of electric charge) on the measurement in free gyro mode.

Other characteristics and advantages of the invention appear on reading the following description of a particular, non-limiting implementation of the invention.

Reference is made to the sole accompanying FIGURE that is a diagram of an inertial device for implementing the method of the invention.

With reference to the FIGURE, the method is implemented by means of an inertial device given overall reference 1 and including a platform 2 (shown diagrammatically in chain-dotted lines) provided in conventional manner with a vibratory angle sensor referenced 3. The vibratory angle sensor 3 is of a structure that is itself known. A few details of the structure of the vibratory angle sensor 3 are described herein for the needs of describing the method of the invention. The vibratory angle sensor 3 comprises an axially symmetrical resonator of silica material fitted with electrodes that serve in an excitation mode to set the resonator into vibration in such a manner that its vibration is symmetrical relative to an axis perpendicular to a reference axis of the vibratory angle sensor 3 and of angular position about the reference axis that can be adjustable when the sensor is controlled in rate gyro mode by controlling the electrodes electrically in appropriate manner, known as "precession" control. The electrodes are also used in a detection mode in order to determine the angular position of the vibration. When the angle sensor is used in free gyro mode, the orientation of the vibration about the axis is left free, and the movement of the vibration can be used to obtain information about the angular movement of the sensor.

The inertial device is mounted on a rotary device 10 having a turntable 11 supported by a pivot base 12 enabling the turntable 11 to be turned about an axis normal thereto. The pivot base 12 incorporates an angle adjustment system 13 for adjusting the angle of the turntable about the axis of rotation. This type of angle adjustment system is itself known and is to be found for example in indexing plates for machine tools. By way of example, the angle adjustment system may comprise means for locking the turntable in predetermined positions (with the locking members comprising, for example, a radial bolt secured to the turntable 11 and suitable for engaging in recesses formed at predetermined positions in a stationary housing for the pivot base 12 of the rotary device). The turntable 11 is positioned horizontally, e.g. by means of spirit levels secured to the rotary device 10. The rotary device preferably includes motor drive for driving the turntable 11 in rotation. In a variant, if the inertial device 1 includes accelerometers, they may be used for determining the angle of inclination of the turntable of the rotary device and of the inertial device fastened to the turntable of the rotary device, and so that the angle of inclination can be taken into account in conventional manner for positioning the inertial device horizontally or for determining heading.

The vibratory angle sensor 3 is connected to a control unit 5 arranged to control the vibratory angle sensor 3, and to recover and use the signals coming from the vibratory angle sensor 3.

The control unit 5 is arranged to execute a control program of the inertial device in gyro compass mode. The program implements the method in accordance with the invention for determining a heading, in particular towards the north.

The method comprises the steps of:
controlling the sensor in rate gyro mode in order to maintain its vibration at a predetermined electric angle corresponding to a least-error value of the sensor;
controlling the sensor in free gyro mode to measure heading, and controlling the sensor in rate gyro mode once the measurement has been taken and until the next measurement in order to maintain the vibration on the predetermined electric angle.

The measurement is performed after a stabilization period has elapsed after switching from rate gyro mode to free gyro mode, in order to allow the angle sensor and its vibration to stabilize.

The detector means are connected to the control unit 5 by at least one analog-to-digital converter, and the least-error value is selected as a function of the dynamic range of the converter. In the present example, the least-error value is about 45°.

In a variant, the method of the invention includes a prior calibration step in which a series of measurements are performed at different vibration angles, and the least-error value is selected on the basis of the series of measurements.

In another variant, the measurement operation in fact comprises three successive measurements, and comprises the steps of:
placing the inertial device 1 successively in three angular orientations or positions about a vertical axis Z;
for each angular position, adjusting an electric angle of the vibratory angle sensor 3 on the predetermined least-error value and measuring heading; and
determining heading on the basis of the heading measurements and of an angle between the angular positions.

The three angular positions are offset by 120° from one another and they are obtained by causing the turntable to turn so as to position the inertial device successively in the three positions. With the turntable held stationary in each position, the electric angle is re-set on the predetermined position and a measurement is taken.

The predetermined value of the electric angle is the same for all of the angular positions of the inertial device. The value of the electric angle is selected as before so as to have the least-error value.

For each position, the electric angle is set to the same value for the measurements by acting on the precession control (during and/or after changing the position of the inertial device).

The signals coming from the vibratory angle sensor 3 are detected and the corresponding drift of the sensor is then determined. The drift of the vibratory angle sensor is calculated in known manner.

After taking the measurement in the first position, the inertial device is moved into the following position.

The electric angle is then adjusted on the vibratory angle sensor 3 to have the same value as for the first measurement.

The signals coming from the vibratory angle sensor 3 are detected and the corresponding drift of the sensor is then determined.

The operation is then repeated in the third position.

In the example described in detail above, heading is subsequently determined by determining the dependency of the angular speed measurement relative to the measurement position (1, 2, and 3).

The third measurement position may also serve to eliminate the mean measurement error corresponding to the bias of the sensor.

By way of example, heading is determined initially by measuring the angular speed for each angular position of the inertial device, i.e. so as to obtain Angular_Speed1, Angular_Speed2, and Angular_Speed3 respectively when the sensor is placed in its three angular positions Angle1, Angle2, and Angle3 (the three positions of the inertial device 1).

Thereafter, the following regressor is calculated:
Angular_Speedi=A*cos(Anglei)+B*sin(Anglei)+C for i=1, 2, and 3 (a system of three equations in three unknowns); in which:
C is the mean measurement error regardless of the position of the inertial device, i.e. the bias of the sensor, and it is eliminated from the calculation; and
A and B are used to determine the heading, by calculating the arctangent.

Naturally, the invention is not limited to the particular implementations described but also covers any variant coming within the ambit of the invention as defined by the claims.

In particular, the inertial device may have some other number of vibratory angle sensors or of accelerometers, but the inertial device must nevertheless have at least one vibratory angle sensor.

In a variant, it is possible to use two positions at 180°, or four positions at 90°, or even more.

The invention claimed is:

1. A method of determining a heading by means of an inertial device (1) comprising at least one vibratory angle sensor (3) having a resonator associated with detector means and means for setting the resonator into vibration connected to a control unit to have a first mode of operation in which the vibration is left free to move in an angular frame of reference of the resonator, and a second mode of operation in which the vibration is maintained at a predetermined angle in the frame of reference of the resonator, and the method comprising the steps of:
controlling the sensor in the second mode of operation to maintain the vibration on a predetermined electric angle corresponding to a least-error value of the sensor; and
controlling the sensor in the first mode of operation to take a heading measurement, and controlling the sensor in the second mode of operation once the measurement has been taken and until the next measurement in order to maintain the vibration on the predetermined electric angle.

2. A method according to claim 1, wherein the detector means are connected to the control unit via at least one analog-to-digital converter, and the least-error value is selected as a function of the dynamic range of the converter.

3. A method according to claim 1, wherein the least-error value is about 45°.

4. A method according to claim 1, including a prior calibration step in which a series of measurements are performed for different vibration angles, and the least-error value is selected from the series of measurements.

5. A method according to claim 1, wherein the measurement is performed after a stabilization period following the changeover from the second mode of operation to the first mode of operation.

6. A method according to claim 1, wherein a plurality of measurements are performed with the angle sensor set on different orientations, the vibration being maintained on the same predetermined electric angle prior to each measurement.

\* \* \* \* \*